United States Patent [19]
Haartsen

[11] Patent Number: 6,021,124
[45] Date of Patent: Feb. 1, 2000

[54] MULTI-CHANNEL AUTOMATIC RETRANSMISSION QUERY (ARQ) METHOD

[75] Inventor: Jacobus C. Haartsen, Staffanstrop, Sweden

[73] Assignee: Telefonaktiebolaget LM Ericsson, Stockholm, Sweden

[21] Appl. No.: 08/912,834

[22] Filed: Aug. 19, 1997

[51] Int. Cl.$^7$ .................................................. H04L 12/54
[52] U.S. Cl. .......................... 370/336; 370/345; 370/428; 174/749
[58] Field of Search ...................... 370/336–338, 370/345, 347, 412–414, 428–429, 394–398; 714/748, 749, 750, 751

[56] References Cited

U.S. PATENT DOCUMENTS

| | | | |
|---|---|---|---|
| 4,799,215 | 1/1989 | Suzuki | 370/60 |
| 4,970,714 | 11/1990 | Chen et al. | 370/17 |
| 5,453,981 | 9/1995 | Katsube et al. | 370/60.1 |
| 5,519,699 | 5/1996 | Ohsawa | 370/60 |

OTHER PUBLICATIONS

"A Selective–Repeat ARQ Protocol for Parallel Channels And Its Resequencing Analysis" by Nachum Shacham et al., vol. 40, No. 4, Apr. 1, 1992, p. 773 IEEE Transactions on Communications.

"A Selective–Repeat ARQ Protocol for Parallel Channels And Its Resequencing Analysis" by Nachum Shacham et al., Computer Communication Technologies for the 90's, Tel Aviv, Oct. 30–Nov. 3, 1988, pp. 259–264.

"Performance Analysis of Multi–Channel ARQ Protocol" Wan–Chen We et al., Proceedings of the Midwest Symposium on Circuits and Systems, Detroit, vol. 2, No. 36, Aug. 16–18, 1993, Institute of Electrical and Electronics Engineers, pp. 1328–1331, Section III–A, p. 1329.

"Multichannel ARQ Protocol" by Jin–Fu Chang et al., IEEE Transactions on Communications, vol. 41, No. 4, Apr. 1, 1993, pp. 592–598, p. 592, right–hand col., line 8—line 14, p. 593, right–hand col., last paragraph.

*Primary Examiner*—Chi H. Pham
*Assistant Examiner*—Maikhanh Tran
*Attorney, Agent, or Firm*—Burns, Doane, Swecker & Mathis, L.L.P.

[57] ABSTRACT

A multi-channel Automatic Retransmission Query (ARQ) methods transmits data packets from a source to a destination over a communication link that is subdivided into a number of channels. A network using the multi-channel ARQ method sequentially multiplexes the data packets at the source and transmits them over corresponding channels. The network applies a stop-and wait ARQ method on each one of the channels and determines whether the destination has positively acknowledged a previously transmitted data packet. If not, the network retransmits only the data packets that are not positively acknowledged.

64 Claims, 7 Drawing Sheets

MULTI-CHANNEL AUTOMATIC RETRANSMISSION QUERY (ARQ) METHOD

FIELD OF INVENTION

This invention relates to the field of data communications, more particularly, to improving data throughput in a data communication network.

BACKGROUND

Today's information age has experienced a tremendous growth in the volume of data communicated over various networks. For example, enormous amounts of data are transferred every day between computers connected by data networks like intra-nets, internet, local area nets, wide area nets, etc. The speed by which these data are communicated, i.e., data throughput, is an important consideration in a data network. Of course, the network's data throughput is proportional to the amount of communication resources allocated for communicating data, with more allocated resources resulting in a higher data throughput. Since the communication resources are scarce, many networks share these resources among many users.

Another important consideration is a network's overall communication error rate, with some networks requiring residual error rates of less than $10^{-16}$. Some communication networks use packet-switched communication links in which the user information is packetized, and the packets are individually sent as data burst from a source to a destination. In packet-switched networks, the data throughput is expressed in terms of the number of data packets per unit of time. Since the links are not perfect, especially when wireless links are used, the error rate requirement is not easily met unless some type of error correction mechanism is introduced, for correcting errors while data is being communicated over the network.

Error correction schemes can be divided into two classes: a forward-error-correction (FEC) method, and a retransmission method. In the FEC method, extra coding bits are added at the source to increase the redundancy in the information. This extra redundancy will enable the destination to correct errors. In the retransmission method, extra check bits are added to the data packets at the source so that the destination can check the data packets for errors. If the destination detects an error, it will automatically request for a retransmission of the data packet. This type of retransmission method is known as Automatic Retransmit Query (ARQ) method.

The data traffic over a switched packet network is carried out in data bursts. Communication errors often arrive in bursts as well. Therefore, it is more efficient to apply a ARQ method, which requires occasional retransmissions, than to apply FEC coding, which adds a constant overhead irrespective of whether there are communication errors or not. A slight amount of FEC coding is always advantageous to avoid retransmissions of data packets that have very few errors. Accordingly, the use of an ARQ method, preferably, with little FEC, is necessary in order to produce a low residual error rate in a high data throughput network.

A number of ARQ methods is known. In general, the ARQ methods may be divided into a numbered ARQ method and an unnumbered ARQ method. In the numbered ARQ method, each data packet is assigned a packet number that allows the destination to specify which data packets have arrived successfully and which have arrived erroneously. In this way, the data packets do not have to arrive at the destination in the order of transmission from the source. As is well known, the packet-switched networks transfer consecutive packets along different paths having different delays. Therefore, the data packets may arrive out of sequence. By using the packet numbers of the numbered ARQ method, the data packets can be reordered at the destination in proper sequence.

In the unnumbered ARQ method, packets do not carry a packet number. Therefore, the unnumbered ARQ method requires less overhead and, thus, is less complex to implement. In order to avoid out-of-order arrival of data packets, however, the data packets must be communicated in an orderly manner. A well-known unnumbered ARQ method is a stop-and-wait ARQ method in which the source stops and waits until a transmitted data packet is acknowledged. For each data packet, a positive acknowledgement (ACK) must be received from the destination, before a subsequent data packet can be transmitted from the source. If a negative acknowledgement (NAK) is received from the destination, however, the source retransmits the same data packet again. If no acknowledgement is received, the source will automatically retransmit the same data packet after a timeout period.

The delay between the data packet transmission and the arrival of the acknowledgement information is known as a round-trip delay. The round-trip delay determines the data throughput of the network. The longer the round-trip delay, the longer the source has to wait before it can transmit a new data packet or retransmit a NAKed data packet. Accordingly, the data throughput on the communication link is inversely proportional to the round-trip delay between the source and destination. Because during the wait periods, the source is idle and no transmission takes place, in order to maintain a high data throughput, the stop-and-wait ARQ methods are generally used in networks with short round-trip delays.

Figure 1:
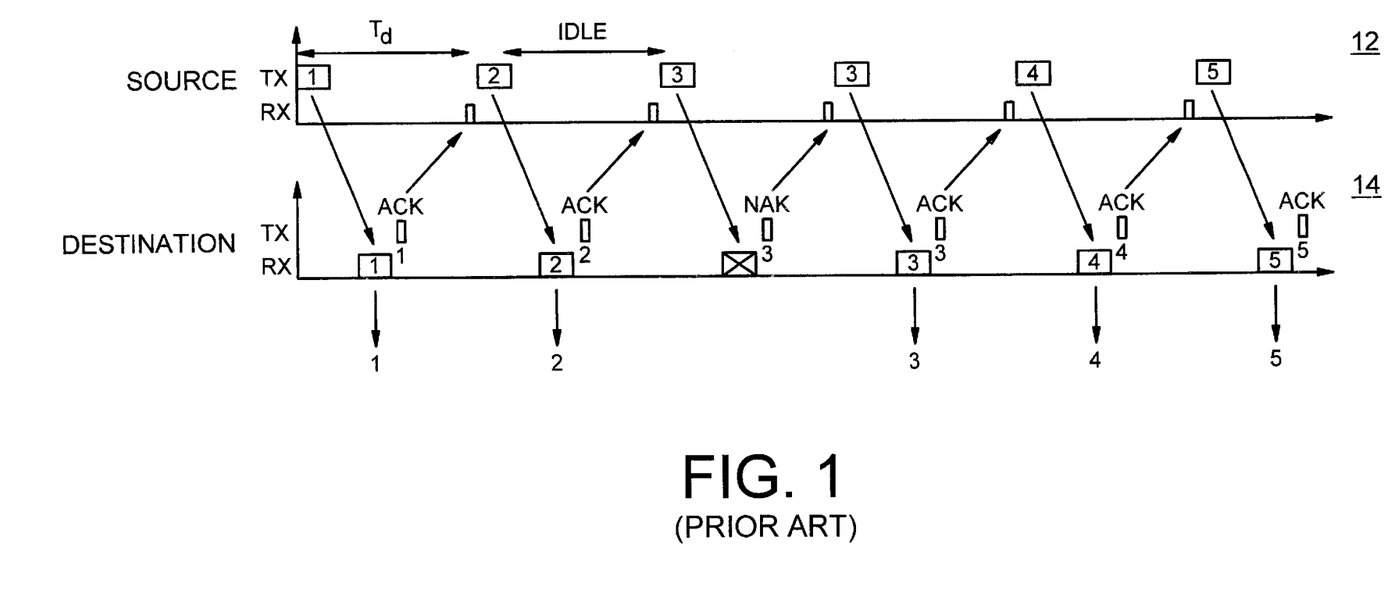
FIG. 1 is a timing diagram of a data packet transfer according to a conventional stop-and-wait ARQ method.

FIG. 1 shows an exemplary timing diagram of a data packet transfer that uses a conventional stop-and-wait ARQ method. As shown, a sequence of five (5) data packets are transmitted from a source 12 to a destination 14. The data packet are shown by numbers 1 to 5 for illustration purpose only. In practice, however, no number is assigned to the data packets. The round trip delay between a packet and its response is shown by $T_d$. If a data packet is not received successfully, the destination 14 transmits a NAK to the source. For example, an erroneously transmitted 3rd data packet, shown by number 3 in FIG. 1, is retransmitted from the source 12 during the next transmission based on a NAK received from the destination 14. Assuming that there are no errors in the returned acknowledgement information, only data packets that have failed during a transmission are retransmitted. Accordingly, the stop-and-wait ARQ method makes efficient use of the communication resource by allowing for sharing of communication resources among users during idle times. Moreover, the data packets arrive at the destination 14 in the order of transmission from the source 12. Thus, under the stop-and-wait ARQ method, there is no need for numbering and reordering of the data packets, which significantly reduces communication overhead.

As described above, if the available communication resource are efficiently allocated, the stop-and-wait ARQ method provides a high overall data throughput. Because of acknowledgment requirement, however, the data throughput per user may be low under the stop-and-wait ARQ method. Although attractive because of its simplicity and resource efficiency, the stop-and-wait ARQ method is less attractive in high-speed networks, especially when the round-trip delay increases.

In order to provide high per user data throughput, most modern data links use the numbered ARQ method. Under this method, a higher data throughput is resulted because of the ability to communicate new data packets before preceding data packets are acknowledged. A well-known numbered ARQ method is go-back-N ARQ method in which each data packet is numbered. In the conventional go-back-N ARQ method, the source uses a rotating N-element buffer containing N data packets, for example, packets k to k+N. The N packets of the buffer are subsequently transmitted. When the source is back at frame k, the source determines whether the corresponding data packet has been acknowledged. If so, the source transmits frame k+N+1. If not, the source transmits the entire buffer contents, including frames k to k+N again. For optimal performance, the buffer length (or the repetition period of the retransmissions) spans over a longer time period than the longest round-trip delay. The go-back-N ARQ method provides a higher throughput per user since the source does not have to wait for an acknowledgement before it can transmit the next data packet. However, the go-back-N ARQ scheme is less efficient from a shared resource point of view, since a single data packet failure results in the retransmission of all data packets in the buffer.

Better performance is obtained with a cumulative go-back-N ARQ method, which is a modified version of the ordinary go-back-N method. In the cumulative method, the destination stores all successfully received data packets, and acknowledges the highest packet number of the data packets received in sequence. This allows the destination to jump over a number of data packets in a rotating buffer if they correspond to data packets with a lower number than the highest packet number the destination indicates. In addition, data packets that have been successfully received once but failed during a retransmission, do not have to be retransmitted again. Although less so than ordinary go-back-N ARQ method, the cumulative method does not prevent the retransmission of successfully received data packets. The buffer lengths in both of these methods depend on the round-trip delay. As in the stop-and-wait ARQ method, the data throughput decreases, when the round-trip delay increases, but only in an error prone environment. Under error free conditions, optimal throughput is obtained.

The most efficient ARQ scheme, both with respect to throughput per user and shared resource efficiency is a selective repeat ARQ method. According to this method, the destination specifies in the acknowledgement exactly which data packet has to be retransmitted. In this way, only failed packets are retransmitted, and no packet transmission is delayed due to a retransmission. The packet numbers are used both for retransmission requests and for the ordering of out-of-sequence data packets. The data throughput is independent of the round-trip delay, and can reach the theoretical limit of what can be achieved with a retransmission method, that is a data throughput of 1-FER, where FER is Frame Error Rate or Packet Error Rate. However, the selective repeat ARQ method requires extensive storage capability and packet handling at both the source and the destination.

Some communication networks transfer data packets in parallel. These networks subdivide the communication link into a number of subchannels for parallel transmission of data packets. In order to guarantee proper ordering of data packets arriving from various subchannels, most conventional networks employ the numbered ARQ method. One conventional network, however, uses the unnumbered ARQ method for transfer of data packets in parallel. This network, which is used by ARPANET and is described by D. Bertsekas and R. Gallager, *"Data Networks,"* 2nd Edition, Prentice Hall International, Inc., London, 1992, applies independent stop-and-wait ARQ methods on eight (virtual) channels in parallel. The data packets are multiplexed over the channels according to availability to transmit a new data packet on the channels. Each data packet contains a virtual channel number identifying the channel on which the data packet is transmitted. As a consequence, the data packets can be transmitted out of order, because the stop-and-wait ARQ method on the separate channels are independent of each other. In other words, retransmissions on one channel will not affect the other channels, but will result in data packets arriving at the destination out of order. As a result, packet numbers at higher protocol layers as required to provide enabling instructions to the destination to properly, reorder the data packets. This method, therefore, requires complicated data-packet reordering overhead, which must be implemented in higher protocol layers.

Therefore, there exists a need for a data communication network with high data throughput which is simple to implement and does not retransmit successfully received data packets unnecessarily.

SUMMARY

Briefly, the present invention is exemplified in a communication network that uses a multi-channel automatic retransmission query (ARQ) for communicating data packets from a source to a destination over a communication link that is subdivided into a number of channels. The network sequentially multiplexes the data packets at the source over corresponding channels during multiplexing rounds. The invention then applies a stop-and wait ARQ method on each one of the channels and determines whether the destination has positively acknowledged a previously transmitted data packet. If not, the network retransmits only the data packets that are not positively acknowledged, after being transmitted during a previous multiplexing round.

At the source, the network of the invention multiplexes the data packets during successive multiplexing rounds, when the data packets are sequentially transmitted on all of the channels. The network halts the multiplexing of new data packets at the source during a subsequent multiplexing round until the destination positively acknowledges successful reception of a data packet that was transmitted over a corresponding channel during the previous multiplexing round. The network only retransmits previously transmitted data packets that are not positively acknowledged. Also, the source may retransmit the data packets if no acknowledgement is received from the destination after a predefined time-out period. At the destination, the network sequentially de-multiplexes the data packets over the channels and halts the de-multiplexing of new data packets over all other channels, if a new data packet is not received over a channel.

According to some of the more detailed features of the invention the network buffers the data packets before transmissions over corresponding channels. Preferably, the network includes source FIFO buffers with predefined lengths for buffering the data packets over the channels in a FIFO manner. In this way, the source halts the transmission of the data packets, when the source FIFO buffer is full. Similarly, the destination includes a destination FIFO buffer for sequentially buffering received data packets over the channels in a FIFO manner. Similar to the source FIFO buffer, the destination FIFO buffer has a predefined length. Under this arrangement, the de-multiplexing of the data packets is halted when the destination FIFO buffer is empty. The destination starts its de-multiplexing operation of the buffered data packets, after the new data packet is received.

According to another detailed feature of the invention, the source includes a multiplexer for multiplexing the data packets on the channels in a rotating manner and the destination includes a de-multiplexer for similarly de-multiplexing the data packets. The multiplexer halts the multiplexing of the data packets, when the transmissions of the data packets are halted and, the de-multiplexer halts the de-multiplexing of the data packets, when the reception of the data packets are halted.

According to other more detailed features of the invention, data packets are pseudo-randomly transmitted over a predetermined number of physical channels, such as radio frequency channels. The destination determines whether a received data packet is a new data packet or not. In response, the destination transmits a positive acknowledgment to the source if a data packet is successfully received over a communication channel, and it transmits a negative acknowledgment to the source if a data packet is not received successfully.

Other features and advantages of the present invention will become apparent from the following description of the preferred embodiment, taken in conjunction with the accompanying drawings, which illustrate, by way of example, the principles of the invention.

DETAILED DESCRIPTION

Figure 2:
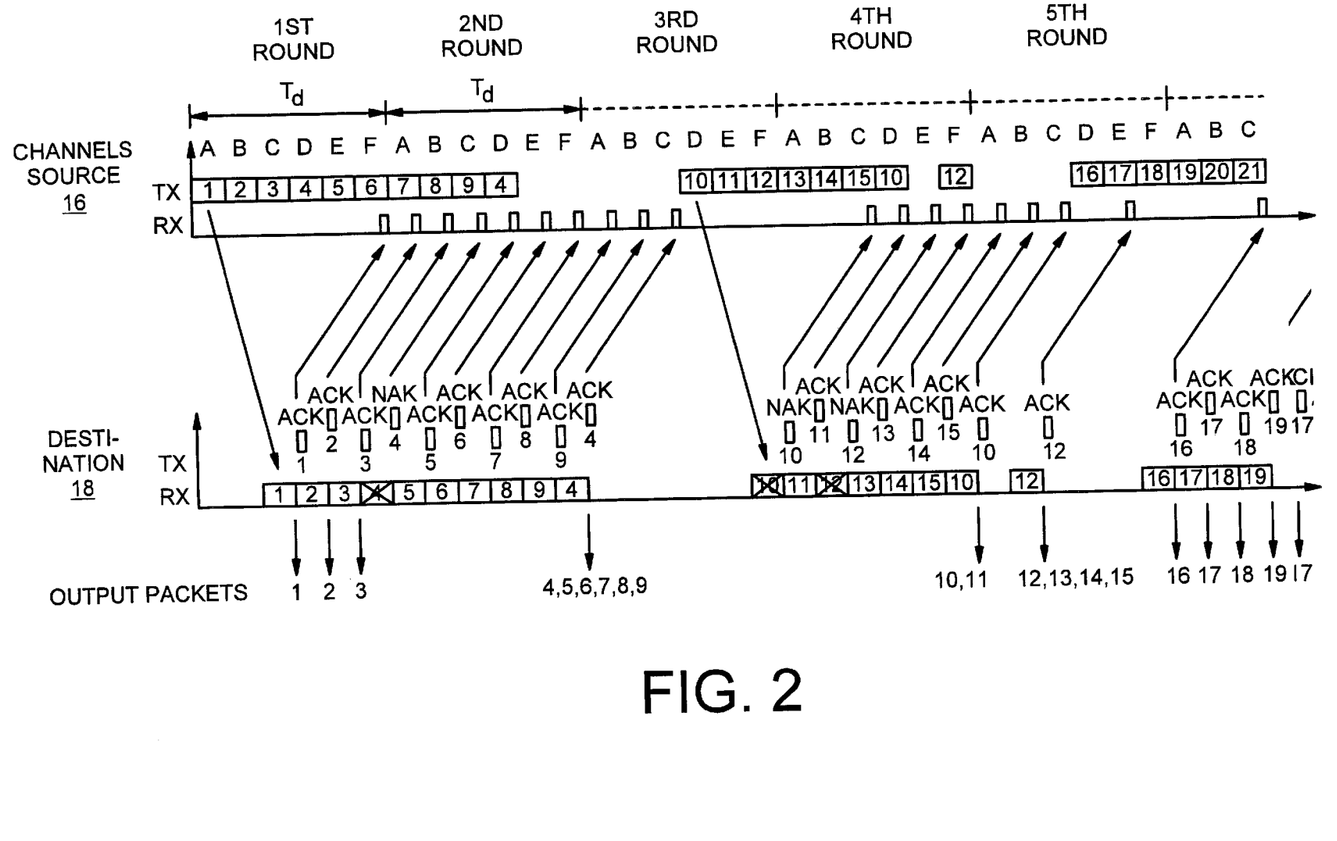
FIG. 2 is a timing diagram of a data packet transfer according to the present invention.

Referring to FIG. 2, a multi-channel ARQ method according to the present invention subdivides each round trip delay into a number of time slots. As shown, the roundtrip delay $T_d$ is divided into six time slots designated as ARQ Channels A–F. In a Time Division Multiplex (TDM) manner, each time slot is used as a virtual channel on a communication link assigned to a user. These channels are used for parallel transfer of data packets between a source 16 and a destination 18. At the source 16, the data packets are sequentially multiplexed over the ARQ Channels A–F and transmitted to the destination 18. The multi-channel ARQ method of the invention applies a stop-and-wait ARQ method on each one of the ARQ Channels A–F. Under this arrangement, the source 16 sequentially transmits data packets in multiplexing rounds, starting with the first ARQ Channel A and ending with the last ARQ Channel F. Therefore, at the end of each multiplexing round the data packets are sequentially multiplexed over all of the ARQ Channels A–F. At the start of a subsequent multiplexing round, the source waits to receive an acknowledgement from the destination 18 before transmitting a new data packet over the same ARQ Channel. During the subsequent round, if a data packet transmitted on a ARQ Channel during a previous round is negatively acknowledged, i.e. NAKed, the source 16 halts multiplexing of the data packets and retransmits the NAKed data packet on its corresponding ARQ Channel, before transmitting any subsequent data packet on that ARQ Channel again. The source 16, however, continues to retransmit only NAKed data packets, if any, on other ARQ Channels until corresponding data packet(s) is (are) positively acknowledged. At the destination 18, the received data packets are sequentially de-multiplexed. In order to maintain data packet ordering, the destination 18 halts the de-multiplexing of the received data packets, if it does not receive a new data packet on a particular ARQ Channel.

As shown in FIG. 2, a first data packet is transmitted on the ARQ Channel A. Subsequently, a second, third, and subsequent data packets (through 6th) are transmitted on ARQ Channels B–F, respectively. These data packets are shown by numbers 1–6, for illustration purpose only. Thus, during a first multiplexing round, the multiplexing continues and all of the six data packets are transmitted on ARQ Channels A–F, respectively. The cumulative duration of the ARQ Channels, i.e., the minimum repetition period of a round, is selected so that sufficient time is allowed for reception of positive acknowledgments (ACKs) or negative acknowledgments (NAKs) from the destination, before another data packet is transmitted during a second round. During the second round, if an ACK is received in response to the transmitted data packet on ARQ Channel A, i.e., the first data packet, which was transmitted during the first round, a subsequent data packet, i.e., the 7th data packet (shown by number 7) is transmitted. This process continues on to the ARQ Channels B, C, and so on. However, if a NAK is received in response to transmission of any data packet during the first round, the source halts to multiplex the data packets and only retransmits the NAKed data packets during the second round.

For example, FIG. 2 shows that a fourth data packet (shown by number 4) transmitted on ARQ Channel D to be NAKed. Before transmitting a new data packet on ARQ Channel D during the second round, the source 16, which had continued on to transmit data packets on ARQ Channels E, F, etc., during the first round, retransmits the fourth data packet again on channel D during the second round. If the data packets transmitted on Channels E, F, A, B, C during the first round are all ACKed, as is the case in this example, the source 16 only retransmits the NAKed fourth data packet and stops transmission of new data packets on subsequent ARQ Channels during the second round, until an ACK is received for the fourth data packet. Accordingly, contrary to conventional methods, the previously ACKed data packets are not retransmitted unnecessarily. Instead, the source 16 remains idle until it reaches ARQ Channel D during a subsequent third round. If during the third round, an ACK is received in response to the retransmission of the fourth packet, then a new data packet, i.e., a 10th data packet, is transmitted on ARQ Channel D. Provided that previously transmitted data packets on the ARQ Channels have all been ACKed, new data packets are transmitted on subsequent ARQ Channels E through F.

If, however, one or more previously transmitted data packets are NAKed, only the retransmissions of the NAKed data packets take place on the ARQ channels during a subsequent round. This situation is illustrated by an exemplary data packet transfer starting from the third round. Let's assume that a 10th and a 12th data packets (shown by numbers 10 and 12), which where transmitted on ARQ Channels D and F of the third round, were NAKed. As shown, during a subsequent fourth round, only the 10th and 12th data packets are retransmitted. Once ACKs are received for the 10th and 12th data packets during a subsequent fifth round, then new data packets are transmitted.

At the destination 18 the first through third data packets are received and demultiplexed successfully during the first round. However, because of the NAKed fourth data packet, the destination 18 halts the de-multiplexing operation to maintain order in the sequence of the received data packets. Once the fourth data packet is positively acknowledged, the destination 18 resumes the de-multiplexing of the 4th through 9th data packets, which were all received correctly. When it reaches the 10th NAKed data packet, it halts the de-multiplexing operation again until it can positively acknowledge this data packet. Once acknowledged, the destination resumes its de-multiplexing operation. The same process continues for the NAKed 12th data packet until all the received data are positively acknowledged. It is noted that the multiplexer at the source and the de-multiplexer at the destination operate independently and are not synchronized. The multiplexer steps forward in response to ACKed packets, whereas the de-multiplexer steps forward in response to new arrived packets. Therefore, the duration of the multiplexing rounds may be different from each other.

As is well known, sometimes acknowledgement errors arise during data packet transfers. An acknowledgement error arises when a data packet has been successfully received at the destination 18, however, the associated ACK is not received successfully at the source 16. As a result, after a predefined time out period, the source 16 retransmits the same packet again. In this situation, the destination 18 must be able to distinguish between the retransmission of an old data packet and a new data packet. In order to handle the acknowledgment errors, the present invention assigns a sequence number to each data packet. In its simplest form, the sequence number may be a single bit which is toggled from one binary state to another for each new data packet. By checking the sequence numbers of consecutive data packets on a single ARQ channel, the destination 18 determines whether a new or an old data packet is received from the source 16. New data packets always have alternating sequence numbers. Otherwise, if the same sequence number is encountered for adjacent data packets, the destination 18 acknowledges the reception of the last data packet but ignores its content.

Figure 3:
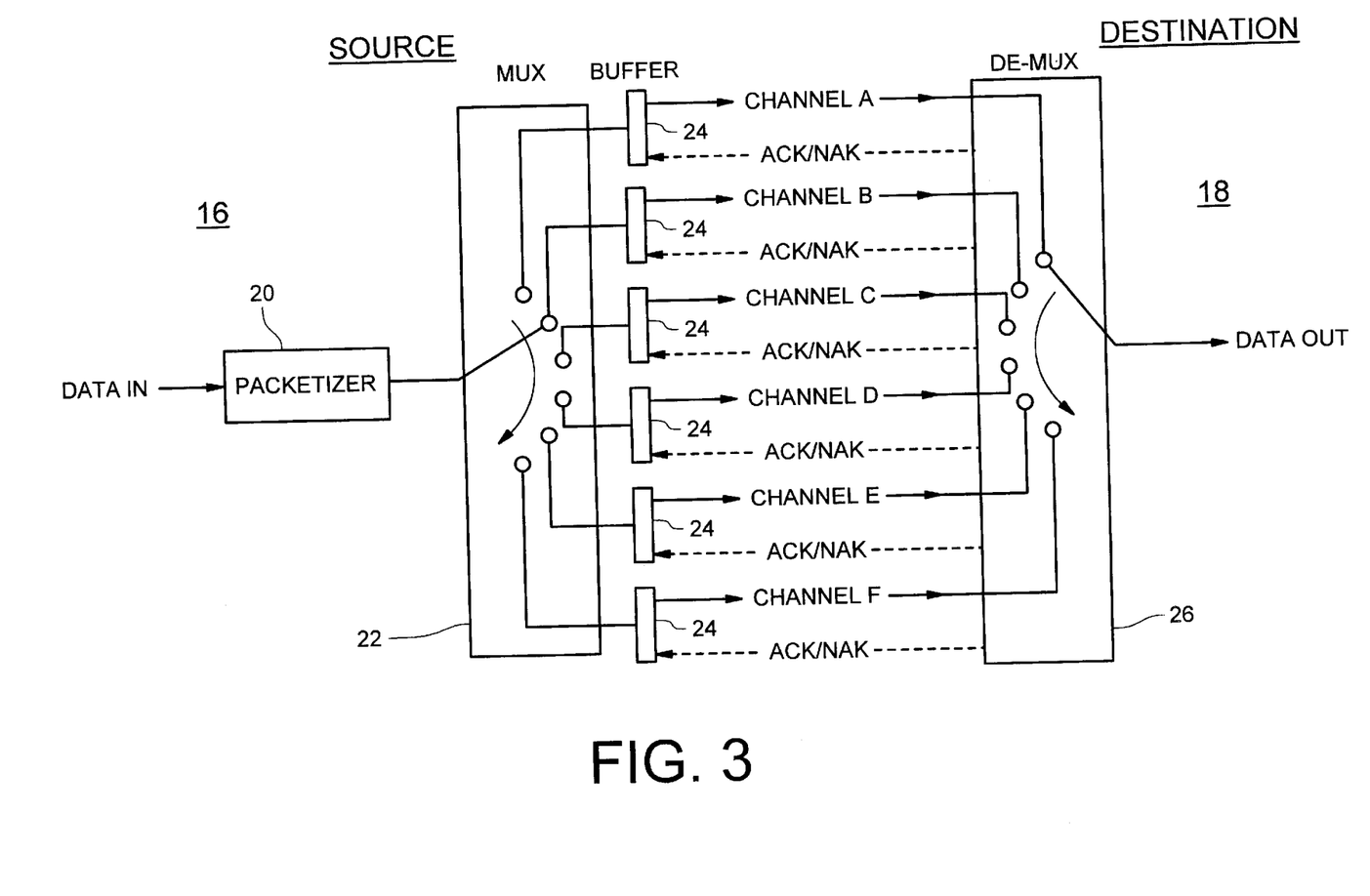
FIG. 3 is a block diagram implementing a multi-channel ARQ method according to one embodiment of the present invention.

Referring to FIG. 3, a simplified block diagram of the implementation of a multi-channel ARQ method according to FIG. 2 is shown. At the source 16, a data packetizer 20 packetizes input data according to a predefined protocol. A multiplexer 22 routes the data packets sequentially over the ARQ Channels A–F in a rotating manner. At the input of each one of the ARQ Channels, single-element buffers 24 store data packets provided by the multiplexer 22 for transmission on a corresponding ARQ Channel. After placing a data packet in a buffer 24 of the last ARQ Channel of each round, i.e., ARQ Channel F, the multiplexer 22 places a subsequent data packet in the buffer of the first ARQ Channel, i.e., ARQ Channel A, during a subsequent round, provided that a previously transmitted data packet on the first ARQ Channel is positively acknowledged. For each ARQ Channel, the corresponding buffer 24 indicates an empty condition each time an ACK is received based on a successful reception of a data packet at the destination 18. Otherwise, the corresponding buffer 24 indicates a full condition.

Under the present invention, separate stop-and-wait ARQ schemes are applied to each ARQ Channel. For as long as a buffer 24 of a particular ARQ Channel indicates an empty condition, the multiplexer 22 continues to load a new data packet in that buffer and moves onto the next ARQ-channel. If a buffer 24 is not empty when the multiplexer 22 arrives at the buffer's corresponding ARQ Channel, it stops its multiplexing operation during that round. During the round, the source 16 only retransmits NAKed data packets on subsequent ARQ Channels. At that time, no new data packets are loaded into the buffers 24 until the non-empty buffer that stopped the multiplexing operation indicates an empty condition, which is resulted when a previously transmitted data packet is positively acknowledged.

At the destination 18, a de-multiplexer 26 operating in a rotating fashion sequentially reads the received data packets over the ARQ Channels A–F. Similar to the multiplexer 22 at the source 16, if the de-multiplexer 26 arrives at an ARQ Channel with no new received data packet, it stops its de-multiplexing operation until a successful data packet is received. Only after the arrival of a new data packet, the de-multiplexer 26 advances to de-multiplex on the subsequent ARQ Channels. The operation of the multiplexer 22 and de-multiplexer 26 according to the invention, which halt their respective multiplexing and de-multiplexing operation when ARQ Channel cannot accept or provide new data packets, assures proper ordering of the received data packets at the destination 18.

Preferably, the repetition period of the multiplexer 22 is selected to be longer than the round-trip delay, to avoid idle times at the source 16. Because the buffers 24 at the ARQ Channels A–F of the multi-channel ARQ method of the invention can be considered as the elements of a circular buffer that is used in a conventional cumulative go-back-N ARQ implementation, the present invention provides similar data per user throughput as that provided by the cumulative method, without the numbering or overhead thereof, while avoiding unnecessary retransmissions of successfully received data packets.

Figure 4:
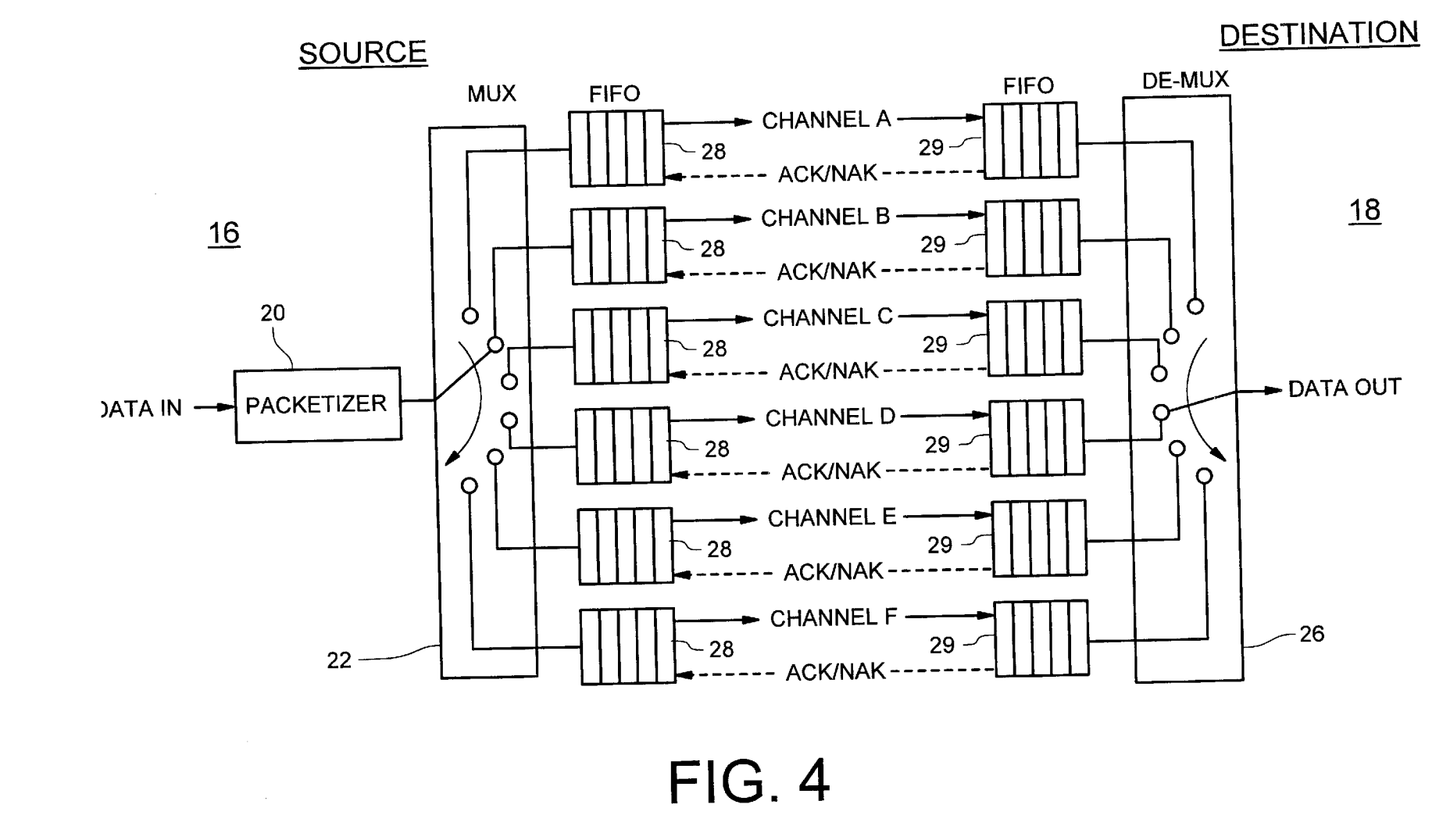
FIG. 4 is a block diagram implementing a multi-channel ARQ method according to another embodiment of the present invention.

Referring to FIG. 4, another embodiment of the present invention improves the performance of the multi-channel ARQ method by using multi-element buffers 28 and 29 at the source 16 and the destination 18. As shown, multi-element source and destination buffers 28 and 29 are positioned at the transmission and reception path of the ARQ Channels A–F, respectively. Preferably, the source and destination buffers 28 and 29 are first-in-first-out (FIFO) buffers. Under this embodiment of the invention, a data packet may be retransmitted from the source 16 on an ARQ Channel, while the multiplexer 22 loads data packets into other source FIFO buffers 28, provided that a corresponding FIFO buffer 28 is not full. Consecutive packets are distributed among the FIFO, i.e., packet k is placed in the first FIFO, packet k+1 in the second FIFO, etc. After the last FIFO, the multiplexer returns to the first FIFO. If a source FIFO buffer 28 is full, the multiplexer 22 stops multiplexing until a transmitted data packet at the end of the full source FIFO buffer is ACKed. Once ACKed, the multiplexer 22 inputs a subsequent data packet into the source FIFO buffer 28.

At the destination 18, the destination FIFO buffers 29 operate to allow for orderly reception of the data packets transmitted from the source FIFO buffers 28. Only new data packets are buffered in the destination FIFO buffers 29. This is true even when a data packet is successfully received, however, is retransmitted due to an a acknowledgement error. In this case, the reception is acknowledged, but the data packet is not stored in the destination FIFO. The de-multiplexer 26 advances its de-multiplexing operation for as long as a destination FIFO buffer 29 is not empty.

When an empty FIFO buffer 20 is encountered, the de-multiplexer 26 stops its de-multiplexing operation on a corresponding ARQ Channel until the arrival of a new data packet over that ARQ Channel. The destination then continues its de-multiplexing of the buffered data packets at the destination FIFO buffers 29, after a new data packet is received.

Figure 5A:
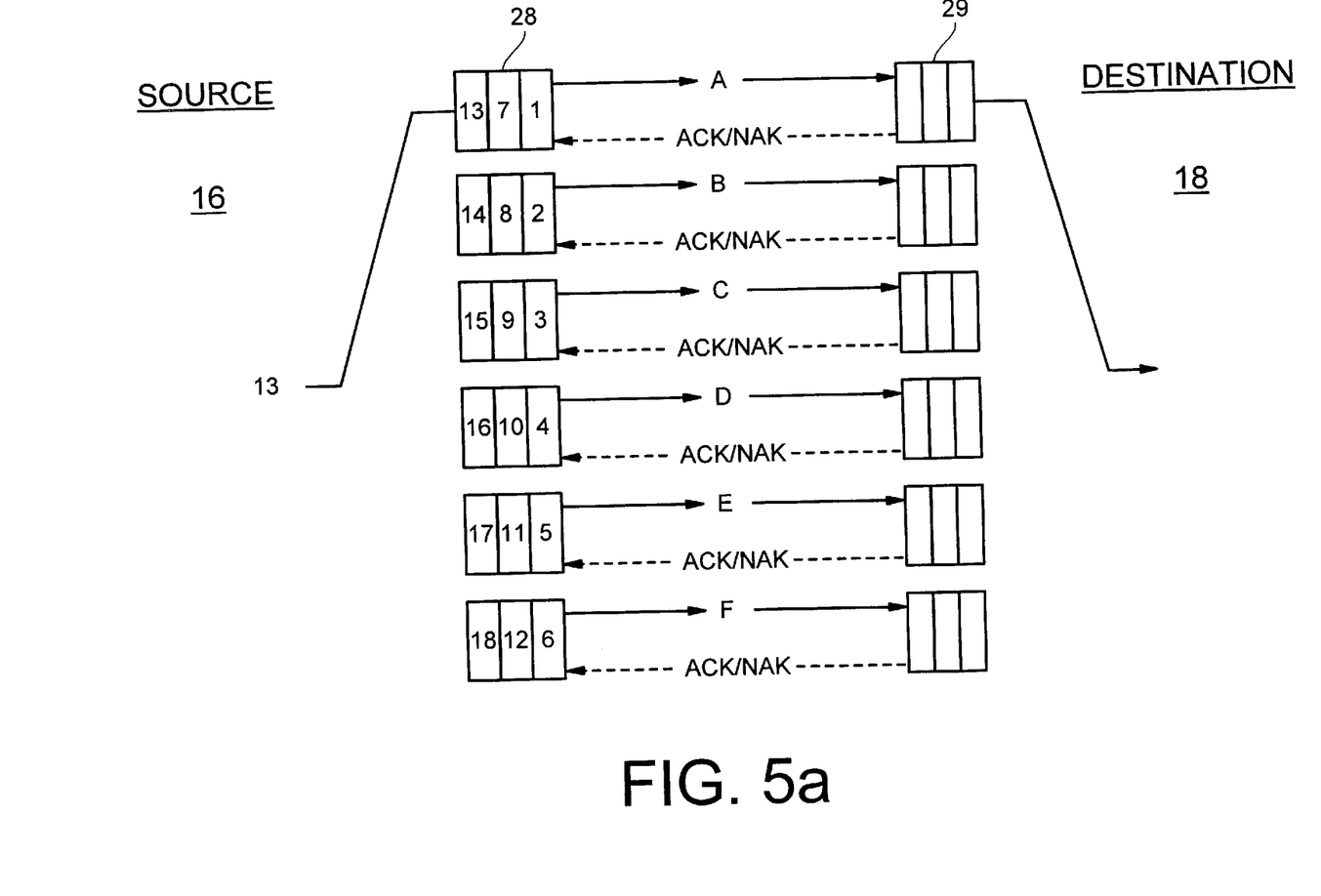
FIGS. 5(a) and 5(b) are diagrams showing two exemplary operation of the multi-channel ARQ method of the embodiment of FIG. 4.
Figure 5B:
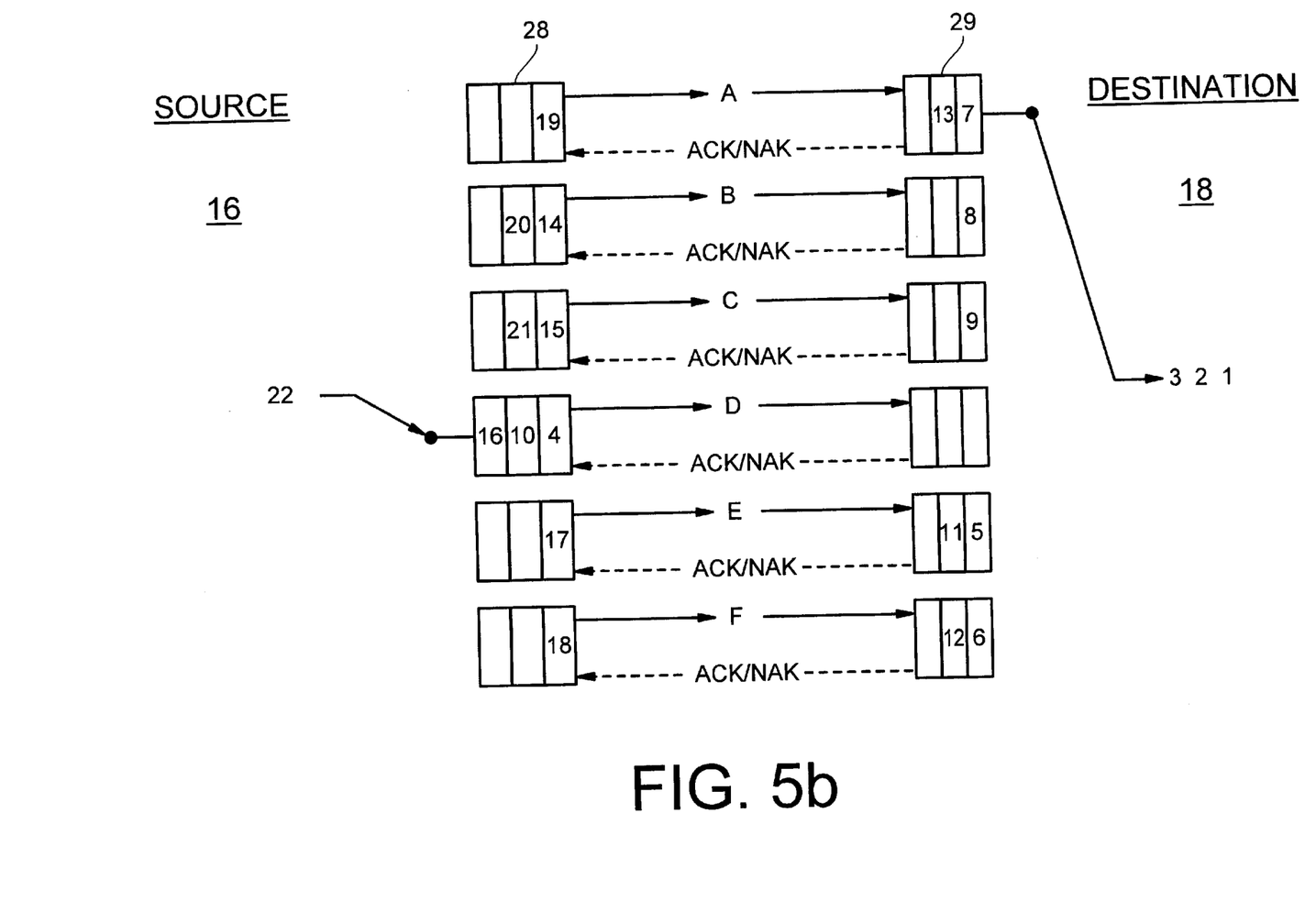

FIGS. 5(a) and 5(b) show exemplary operations of the method of the invention under the embodiment of FIG. 4. In this example, a system with 6 parallel ARQ channels and with 3-element source and destination buffers is shown. It is assumed that the source can load the source FIFOs at a much higher rate than the packets can be transferred over the channels A to F. FIG. 5(a) shows the begin conditions. The multiplexer 22 has distributed packets 1 to 18 over the source FIFOs in a manner as shown in FIG. 5(a). Next, the packets are transmitted independently over the six physical channels. This can occur sequentially when the channels form slots in a TDMA system, or simultaneously when the channels form carrier frequencies in a FDMA system or codes in a CDMA system. As packets are transmitted and successfully received, the FIFOs 28 shift their packets to the end, and new packets may be loaded by the multiplexer 22. In FIG. 5(b), the situation is shown when packets 1 to 3, and packets 5–9 and 11–13 have been received successfully. However, since packet 4 has not been received correctly yet, only packets 1 to 3 have been de-multiplexed and carried on to the final destination. New packets 19 to 21 have been multiplexed and loaded into the source buffers 28 corresponding to channels A to C. However, packet 22 cannot be placed in the proper source buffer (the buffer corresponding to channel D) since this source buffer is full. This is because packet 4 has not been received successfully on channel D and therefore it has not been acknowledged yet. Both the multiplexer 22 and the de-multiplexer 26 have halted at channel D since the source FIFO buffer 28 is full and the destination buffer 29 is empty. Only when the fourth packet is received correctly can the de-multiplexer move forward, whereas only when the acknowledgement of this success has been received by the source can the multiplexer 22 move forward. The transmissions and retransmissions on other channels, however, can continue for as long as their corresponding source FIFO buffers 28 are not empty.

It would be appreciated that even with the implementation of this embodiment, there is a probability that the FIFO buffers 28 could become full due to congestion on a particular ARQ Channel. As a result, while other buffers become empty, their corresponding ARQ Channels would have to wait until the congested ARQ Channel with full FIFO buffer resolves its congestion. The channel congestion probability is decreased by increasing the length of the FIFO buffers 28 and 29. By sufficiently increasing the length of the FIFO buffers 28 and 29, the data throughput of the multi-channel ARQ method of this embodiment of the invention would approach the theoretical limit of (1-FER). As described in connection with the embodiment of FIGS. 2–3, even for a small number of FIFO elements, i.e. one element, a data throughput comparable to that of go-back-N algorithms may be obtained without applying numbering and extra packet overhead, except for handling acknowledgment errors based on the sequence numbers. However, under the embodiment of FIG. 4, sufficiently large FIFO buffers 28 and 29 can increase the data throughput to the theoretical limit, making the methods as efficient as the selective repeat ARQ method.

For optimal performance, each ARQ Channel in the multi-channel ARQ method of the invention should, on average, have an equal error behavior. If retransmissions occur much more frequently on one ARQ Channel than on another, the former ARQ Channel could limit the overall data throughput of the network. Under this situation, it is more advantageous to distribute the data packets over different physical channels, that is, an ARQ channel does not constantly use the same physical channel. If a single physical channel is bad, a single retransmission on a different channel may result in successful reception of a data packet. In contrast, when each data packet is bit-interleaved over multiple physical channels, each packet would be affected by the bad channel, and only a FEC method would help to overcome the transmission errors.

As mentioned above, for each ARQ Channel of the present invention, the average data throughput performance should be the same in order to achieve an optimal overall data throughput performance. However, this will not necessarily be the case in applications where the communication link consists of discrete physical channels, for example, radio frequency (RF) links consisting of a predefined number of parallel Frequency-Division multiplex (FDM) channels. Under this arrangement, the RF link may be deteriorated at one or more portions of the frequency spectrum, due to such factors as multi-path fading, or narrowband interference. Accordingly, not all the physical channels may have the same average quality. To assure equal performance on average, the ARQ Channels of the invention should be distributed over the physical FDM channels, for example, by applying well known spreading and despreading operations, such as frequency hopping.

Figure 6:
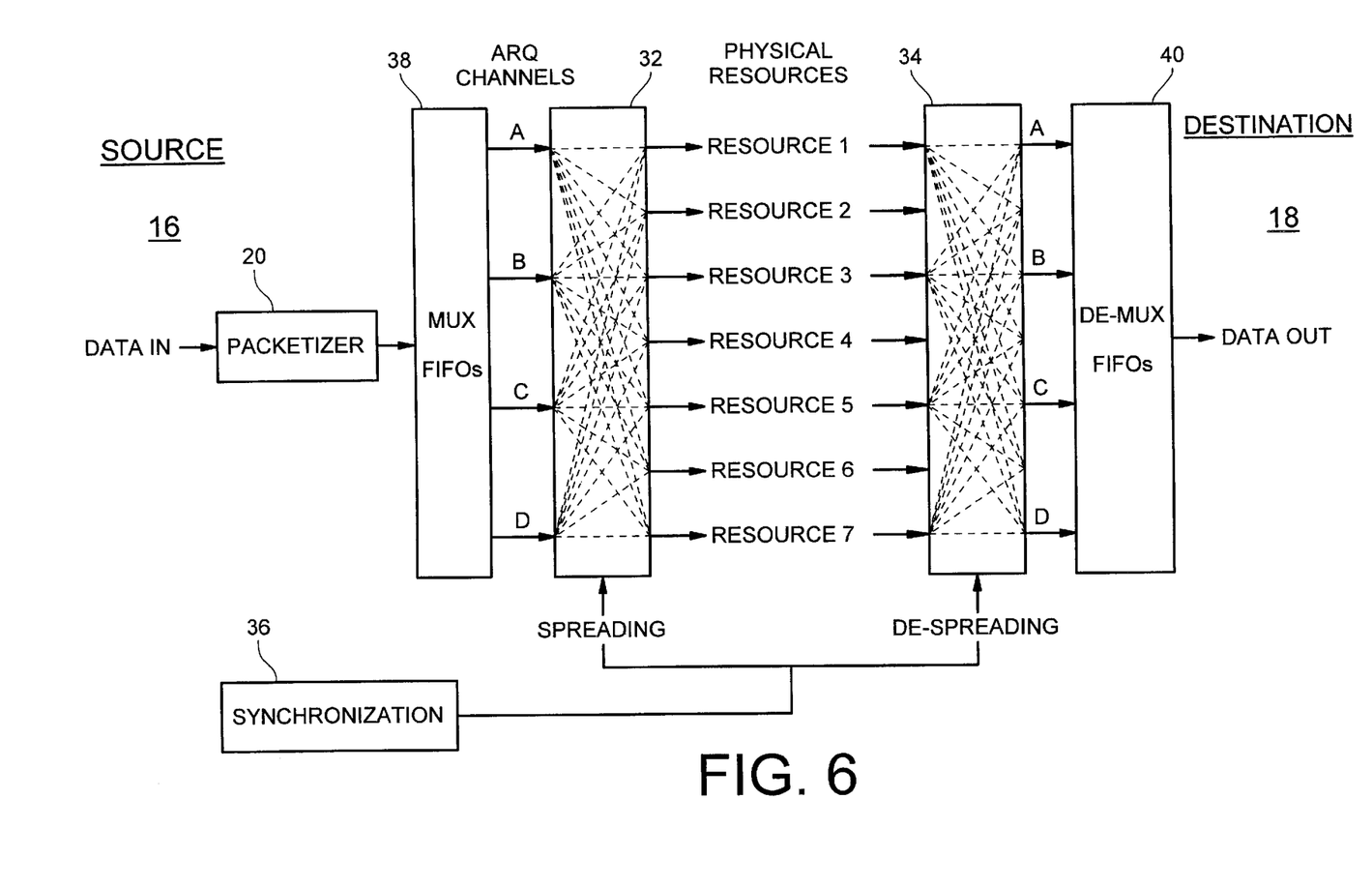
FIG. 6 is a block diagram implementing multi-channel ARQ method according to yet another embodiment of the present invention.

Referring to FIG. 6, one such network is shown where the ARQ channels are spread by a spreader 32 at the source 16 and de-spread by a de-spreader 34 at the destination 18. A synchronization block 36 synchronizes the spreading and de-spreading operations, to achieve an equal error performance on all physical channels. MUX/FIFO and DE-MUX/FIFO blocks 38 and 40 correspond to a multiplexer/demultiplexer 22 and 26 and FIFO buffers 28 and 29 shown in FIG. 4. In an exemplary embodiment, the available physical channels consist of six FDM channels. The network can use four ARQ Channels A–D in parallel. That is, for each new data packet transfer, the source 16 and destination 18 pseudo-randomly assign one of the six physical channels to support one of the four ARQ Channels A–D. In each case, the six physical channels are different from each other; that is, they are orthogonal and no collisions between packets on different ARQ Channels would occur. In FIG. 6, the return channels carrying positive and negative acknowledgement are not shown.

Although only a unidirectional link (half-duplex) has been described above, one of ordinary skill in the art would appreciate that the present invention is equally applicable to a full-duplex link. By applying a similar half-duplex link in opposite direction, the present invention may be extended to cover a full-duplex communication link. Under a full-duplex arrangement, positive or negative acknowledgements, are usually piggybacked in the data packets in both directions. Therefore, explicit ACK/NAK transmissions may not be required.

From the forgoing description it would be appreciated that the present invention provides a high data throughput ARQ method that is unnumbered, thus, simple to implement and does not retransmit successfully received data packets unnecessarily. Due to multiplexing and de-multiplexing at the source and destination, respectively, the unnumbered ARQ method of the invention transmits the data packets in parallel, without requiring substantial packet ordering overhead. As described above, by increasing the size of FIFO buffers at the source and destination, the present invention can provide a data throughput approaching the theoretical limit, regardless of the round-trip delays.

Although the invention has been described in detail with reference only to a preferred embodiment, those skilled in the art will appreciate that various modifications can be made without departing from the invention. Accordingly, the invention is defined only by the following claims which are intended to embrace all equivalents thereof.

What is claimed is:

1. A method for transmitting data packets from a source to a destination over a data communication link that is divided into a number of channels comprising the steps of:
   sequentially multiplexing the data packets at the source over the channels during successive multiplexing rounds;
   transmitting the data packets;
   halting the multiplexing of new data packets during a subsequent multiplexing round until the reception of a data packet that was transmitted over a corresponding channel during a previous multiplexing round is positively acknowledged; and
   retransmitting only the data packets that are not positively acknowledged.

2. The method of claim 1 further including the step of buffering at least one data packet at the source, before transmitting it over a corresponding channel.

3. The method of claim 1 further including the step of buffering a number of data packets at the source in a FIFO manner, before transmitting them over at least one channel.

4. The method of claim 3, wherein the data packets are buffered in a FIFO buffer having a predefined length, and wherein the multiplexing of the data packets is halted over the at least one channel, when the FIFO buffer is full.

5. The method of claim 1, wherein the step of multiplexing the data packets at the source is in a rotating manner.

6. The method of claim 3, wherein the step of halting the multiplexing of new data packets includes the step of halting the buffering of the data packets into the FIFO buffer.

7. The method of claim 1 further including the step of retransmitting the data packets if a negative acknowledgement is received or if a positive acknowledgment is not received after a predefined time period.

8. The method of claim 1, wherein the data packets are pseudo-randomly transmitted over a predetermined number of physical channels.

9. The method of claim 1, wherein the physical channels include radio frequency channels.

10. A method for receiving data packets transmitted from a source at a destination over a data communication link that is divided into a number of channels comprising the steps of:
    sequentially de-multiplexing the data packets over the channels;
    if a new data packet is not received over a channel, halting the de-multiplexing of new data packets over all other channels;
    at the destination, sequentially buffering received data packets from the channels in a FIFO manner; and
    de-multiplexing the buffered data packets, after the new data packet is received.

11. The method of claim 10 further including the step of transmitting a positive acknowledgment to the source if a data packet is successfully received over a channel.

12. The method of claim 10 further including the step of transmitting a negative acknowledgment to the source if a data packet is not successfully received over a channel.

13. The method of claim 10 further including the step of determining whether a received data packet is a new data packet or not.

14. The method of claim 10, wherein the data packets are buffered at the destination in a FIFO buffer having a predefined length, wherein the de-multiplexing of the data packets is halted, when the FIFO buffer is empty.

15. The method of claim 10, wherein the step of de-multiplexing of the data packets at the destination includes the step of de-multiplexing the data packets on the channels in a rotating manner.

16. The method of claim 14, wherein the de-multiplexing operates independently of a packet multiplexing at the source, wherein the multiplexing of the data packets at the source are over the channels during successive multiplexing rounds.

17. A method for communicating data packets between a source and a destination, comprising the steps of:
    dividing a data communication link into a number of channels;
    sequentially multiplexing the data packets at the source over the channels during successive multiplexing rounds;
    transmitting the data packets;
    halting the multiplexing of new data packets during a subsequent multiplexing round until the reception of a data packet that was transmitted over a corresponding channel during a previous multiplexing round is positively acknowledged;
    retransmitting only the data packets that are not positively acknowledged, after being transmitted during the previous multiplexing round;
    sequentially de-multiplexing the data packets over the channels; and
    halting the de-multiplexing of new data packets over all other channels, if a new data packet is not received over a channel.

18. The method of claim 17 further including the step of buffering at least one data packet at the source before transmitting it over a corresponding channel.

19. The method of claim 17 further including the step of buffering a number of data packets at the source in a FIFO manner, before transmitting them over at least one channel.

20. The method of claim 19, wherein the data packets are buffered in a FIFO buffer having a predefined length, wherein the multiplexing of the data packets is halted over the at least one channel, when the FIFO buffer is full.

21. The method of claim 17, wherein the step of multiplexing the data packets from the source during the multiplexing rounds includes the step of multiplexing the data packets on the channels in a rotating manner.

22. The method of claim 19, wherein the step of halting the multiplexing of new data packets includes the step of halting the buffering of the data packets.

23. The method of claim 17 further including the step of retransmitting the data packets if a negative acknowledgement is received or if a positive acknowledgment is not received after a predefined time period.

24. The method of claim 17, wherein the data packets are pseudo-randomly transmitted over a predetermined number of physical channels.

25. The method of claim 17, wherein the physical channels include radio frequency channels.

26. The method of claim 17 further including the step of buffering received data packets at each channel at the destination in a FIFO manner; and de-multiplexing the buffered data packets, after the new data packet is received.

27. The method of claim 17 further including the step of transmitting a positive acknowledgment to the source if a data packet is successfully received over a channel.

28. The method of claim 17 further including the step of transmitting a negative acknowledgment to the source if a data packet is not successfully received over a channel.

29. The method of claim 17 further including the step of determining whether a received data packet is a new data packet or not.

30. The method of claim 26, wherein the data packets are buffered at the destination in a FIFO buffer having a predefined length, wherein the de-multiplexing of the data packets is halted when the FIFO buffer is empty.

31. The method of claim 17, wherein the step of de-multiplexing of the data packets at the destination includes the step of de-multiplexing the data packets on the channels in a rotating manner.

32. The method of claim 30, wherein the steps of multiplexing and de-multiplexing are independent of each other.

33. A multi-channel automatic retransmission query (ARQ) method comprising the steps of:

dividing a data communication link into a number of channels;

sequentially multiplexing the data packets at the source over the channels and transmitting them to a destination over corresponding channels;

applying a stop-and wait ARQ method on each one of the channels;

determining whether the destination positively acknowledges a previously transmitted data packet;

halting the multiplexing of new data packets during a subsequent multiplexing round until the reception of a data packet that was transmitted over a corresponding channel during a previous multiplexing round is positively acknowledged; and retransmitting only the data packets that are not positively acknowledged.

34. The method of claim 33 further including the step of buffering at least one data packet at the source, before transmitting it over a corresponding channel.

35. The method of claim 33 further including the step of buffering a number of data packets at the source in a FIFO manner, before transmitting them over at least one channel.

36. The method of claim 35, wherein the data packets are buffered in a FIFO buffer having a predefined length.

37. The method of claim 33, wherein the step of multiplexing the data packets at the source during the multiplexing rounds includes the step of multiplexing the data packets on the channels in a rotating manner.

38. The method of claim 36, wherein the step of halting the multiplexing of new data packets includes the step of halting the buffering of the data packets.

39. The method of claim 33 further including the step of retransmitting the data packets if a negative acknowledgement is received or if a positive acknowledgment is not received after a predefined time period.

40. The method of claim 33, wherein the data packets are pseudo-randomly transmitted over a predetermined number of physical channels.

41. The method of claim 40, wherein the physical channels include radio frequency channels.

42. The method of claim 33 further including the step of sequentially buffering received data packets over the channels at the destination in a FIFO manner; and de-multiplexing the buffered data packets, after the new data packet is received.

43. The method of claim 33 further including the step of transmitting a positive acknowledgment to the source if a data packet is successfully received over a channel.

44. The method of claim 33 further including the step of transmitting a negative acknowledgment to the source if a data packet is not successfully received over a channel.

45. The method of claim 33 further including the step of determining whether a received data packet is a new data packet or not.

46. The method of claim 42, wherein the data packets are buffered at the destination in a FIFO buffer having a predefined length, wherein the de-multiplexing of the data packets is halted, when the FIFO buffer is empty.

47. The method of claim 33, wherein the step of de-multiplexing the data packets at the destination includes the step of de-multiplexing the data packets on the channels in a rotating manner.

48. The method of claim 46, wherein the step of halting the de-multiplexing of the data packets includes the step of halting the buffering of the data packets.

49. A network for communicating data packets between a source and a destination over a data communication link that is subdivided into a number of channels, comprising:

means for multiplexing the data packets from the source during successive multiplexing rounds, means for transmitting the data packets;

means for halting multiplexing of new data packets until the destination positively acknowledges successful reception of a data packet, wherein the means for transmitting the data packets only retransmits the data packets that are not positively acknowledged.

50. The network of claim 49 further including means for sequentially de-multiplexing the data packets over the channels at the destination; and means for halting the de-multiplexing of new data packets over all other channels, if a new data packet is not received over a channel.

51. The network of claim 49 further including a buffer for buffering at least one data packet at the source, before transmitting it over a corresponding channel.

52. The network of claim 49 further including at least one source FIFO buffer for buffering a number of data packets at the source in a FIFO manner before transmitting them over at least one channel.

53. The network of claim 49, wherein the at least one source FIFO buffer has a predefined length, and wherein the multiplexing of the data packets is halted, when the source FIFO buffer is full.

54. The network of claim 49, wherein the means for multiplexing multiplexes the data packets on the channels in a rotating manner.

55. The network of claim 54, wherein the means for multiplexing halts the buffering of the data packets, when the multiplexing of the data packets are halted.

56. The network of claim 54, wherein the means for transmitting retransmits the data packets if a negative acknowledgement is received or if a positive acknowledgment is not received after a predefined time period.

57. The network of claim 49, wherein the data packets are pseudo-randomly transmitted over a predetermined number of physical channels.

58. The network of claim 57, wherein the physical channels include radio frequency channels.

59. The network of claim 49 further including destination FIFO buffers for buffering received data packets over the channels at the destination in a FIFO manner; wherein the buffered data packets are sequentially de-multiplexed, after the new data packet is received.

60. The network of claim 49 further including means for transmitting a positive acknowledgment to the source, if a data packet is successfully received over a channel.

61. The network of claim 49 further including means for transmitting a negative acknowledgment to the source, if a data packet is not successfully received over a channel.

62. The network of claim 49 further including means for determining whether a received data packet is a new data packet or not.

63. The network of claim 59, wherein the destination FIFO buffer has a predefined length, wherein the de-multiplexing of the data packets is halted when the destination FIFO buffer is empty.

64. The network of claim 59 further including a de-multiplexer for de-multiplexing the data packets on the channels in a rotating manner.

* * * * *